US011000157B2

United States Patent
Bassill et al.

(10) Patent No.: US 11,000,157 B2
(45) Date of Patent: May 11, 2021

(54) HOT AND COLD HOLDING SYSTEM

(71) Applicant: Hatco Corporation, Milwaukee, WI (US)

(72) Inventors: Nick Bassill, Milwaukee, WI (US); Ishan Shah, Milwaukee, WI (US); Brad Stoeckel, Milwaukee, WI (US); Gerhard H. Wenzel, Milwaukee, WI (US); Mark Gilpatric, Milwaukee, WI (US); Jefferson Leach, Milwaukee, WI (US); Fei Shang, Milwaukee, WI (US); Edward Nunn, Milwaukee, WI (US)

(73) Assignee: Hatco Corporation, Milwaukee, WI (US)

( * ) Notice: Subject to any disclaimer, the term of this patent is extended or adjusted under 35 U.S.C. 154(b) by 26 days.

(21) Appl. No.: 15/984,002

(22) Filed: May 18, 2018

(65) Prior Publication Data

US 2018/0333006 A1 Nov. 22, 2018

Related U.S. Application Data

(60) Provisional application No. 62/508,816, filed on May 19, 2017.

(51) Int. Cl.
*A47J 39/00* (2006.01)
*F25B 21/04* (2006.01)
(Continued)

(52) U.S. Cl.
CPC ......... *A47J 39/006* (2013.01); *A47J 36/2483* (2013.01); *A47J 36/32* (2013.01);
(Continued)

(58) Field of Classification Search
CPC ...... A47J 39/006; A47J 36/2483; A47J 36/32; A47J 39/003; A47J 2202/00; F25B 21/04;
(Continued)

(56) References Cited

U.S. PATENT DOCUMENTS

| 4,823,554 A * | 4/1989 | Trachtenberg ......... A47J 36/26 62/239 |
| 2011/0277644 A1* | 11/2011 | Frauenfeld ............. A47F 10/06 99/483 |

(Continued)

*Primary Examiner* — Jun S Yoo
(74) *Attorney, Agent, or Firm* — Foley & Lardner LLP (57) ABSTRACT

A food pan well includes a base defining an internal cavity and a temperature regulating system disposed within the internal cavity. The temperature regulating system includes an internal enclosure and at least one of a cooling assembly and a warming assembly. The internal enclosure is positioned within the internal cavity. The internal enclosure includes a bottom wall and a sidewall that extends around a periphery of the bottom wall. The bottom wall and the sidewall cooperatively define a temperature regulated cavity. The base is configured to support one or more food pans such that the one or more food pans are selectively suspendable within the temperature regulated cavity. The cooling assembly is positioned to facilitate cooling at least one of the one or more food pans and the warming assembly is positioned to facilitate warming at least one of the one or more food pans.

11 Claims, 6 Drawing Sheets

(51) Int. Cl.
*A47J 36/32* (2006.01)
*A47J 36/24* (2006.01)
(52) U.S. Cl.
CPC ............. *A47J 39/003* (2013.01); *F25B 21/04* (2013.01); *A47J 2202/00* (2013.01); *F25B 2321/021* (2013.01)
(58) Field of Classification Search
CPC ........ F25B 2321/021; F25B 2321/0212; F25B 2321/025; F25B 2321/0251; F25B 2321/0252
See application file for complete search history.

(56) References Cited

U.S. PATENT DOCUMENTS

2015/0245723 A1\* 9/2015 Alexander ............. F25B 21/04
99/483
2018/0014635 A1 1/2018 Turner et al.

\* cited by examiner

HOT AND COLD HOLDING SYSTEM

CROSS-REFERENCE TO RELATED PATENT APPLICATIONS

This application claims the benefit of U.S. Provisional Patent Application No. 62/508,816, filed May 19, 2017, which is incorporated herein by reference in its entirety.

BACKGROUND

Food products may need to be maintained at a certain temperature (e.g., before being served to a customer, etc.). For example, many food products need to be maintained in a certain temperature range to provide a desired eating experience or to comply with food safety regulations. Food products are traditionally maintained at a desired temperature using a unit that provides a temperature-controlled environment. By way of example, food pans may be typically heated in one set of wells and cooled in another set of wells of a temperature regulation unit. However, such split temperature regulation units require a large footprint and do not allow a food service operator to easily change the configuration of the food serving line or preparation line.

SUMMARY

One embodiment relates to a food pan well. The food pan well includes a base defining an internal cavity and a temperature regulating system disposed within the internal cavity. The temperature regulating system includes an internal enclosure and at least one of a cooling assembly and a warming assembly. The internal enclosure is positioned within the internal cavity. The internal enclosure includes a bottom wall and a sidewall that extends around a periphery of the bottom wall. The bottom wall and the sidewall cooperatively define a temperature regulated cavity. The base is configured to support one or more food pans such that the one or more food pans are selectively suspendable within the temperature regulated cavity. The cooling assembly is positioned to facilitate cooling at least one of the one or more food pans and the warming assembly is positioned to facilitate warming at least one of the one or more food pans.

Another embodiment relates to a temperature regulating system for a hot-cold well. The temperature regulating system includes an enclosure, a cooling assembly, and a warming assembly. The enclosure includes a bottom wall and a sidewall that extends around a periphery of the bottom wall. The bottom wall and the sidewall cooperatively define a temperature regulated cavity. One or more food pans are selectively suspendable within the temperature regulated cavity. The cooling assembly is configured to facilitate cooling at least one of the one or more food pans. The warming assembly is configured to facilitate warming at least one of the one or more food pans.

Still another embodiment relates to a hot-cold well. The hot-cold well includes a base and a temperature regulating system disposed within the base. The temperature regulating system includes an internal enclosure positioned within the base, a cooling element, and a warming element. The internal enclosure defines a temperature regulated cavity. The base is configured to support one or more food pans such that the one or more food pans are selectively suspendable within the temperature regulated cavity. The cooling element is positioned to facilitate cooling at least one of the one or more food pans. The warming element is positioned to facilitate warming at least one of the one or more food pans. The temperature regulating system facilitates providing at least one of variable zoned cooling and variable zoned heating within the temperature regulated cavity such that a first pan suspended within the temperature regulated cavity can be regulated to a different temperature than a second pan suspended within the temperature regulated cavity.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, a temperature regulation unit (e.g., a hot-cold well, a hot-cold food pan holder, etc.) includes a warming assembly that utilizes heating mechanisms (e.g., induction heaters, radiant heaters, Peltier devices, blanket heaters, strip heaters, etc.) and/or a cooling assembly including cooling mechanisms (e.g., an evaporative gas cooling system, a Peltier cooling system, cooling coils, Peltier devices, etc.). The temperature regulation unit may be capable of switching between a heating operation and a cooling operation, may be capable of providing a heating operation to a first zone and a cooling operation to a second zone simultaneously, and/or may be capable of providing varying degrees of heating and/or cooling to two or more zones simultaneously. An electronic control unit may control and regulate the temperature of one or more food pans received by the temperature regulation unit. Such a temperature regulation unit may advantageously save space in kitchen operations, save time, and/or provide a more sanitary environment. Traditional hot-cold wells require water systems to provide steam to heat food pans which may be large and unsanitary. The temperature regulation unit may also include an adjustable base that accommodates pans of different depths.

Figure 1:
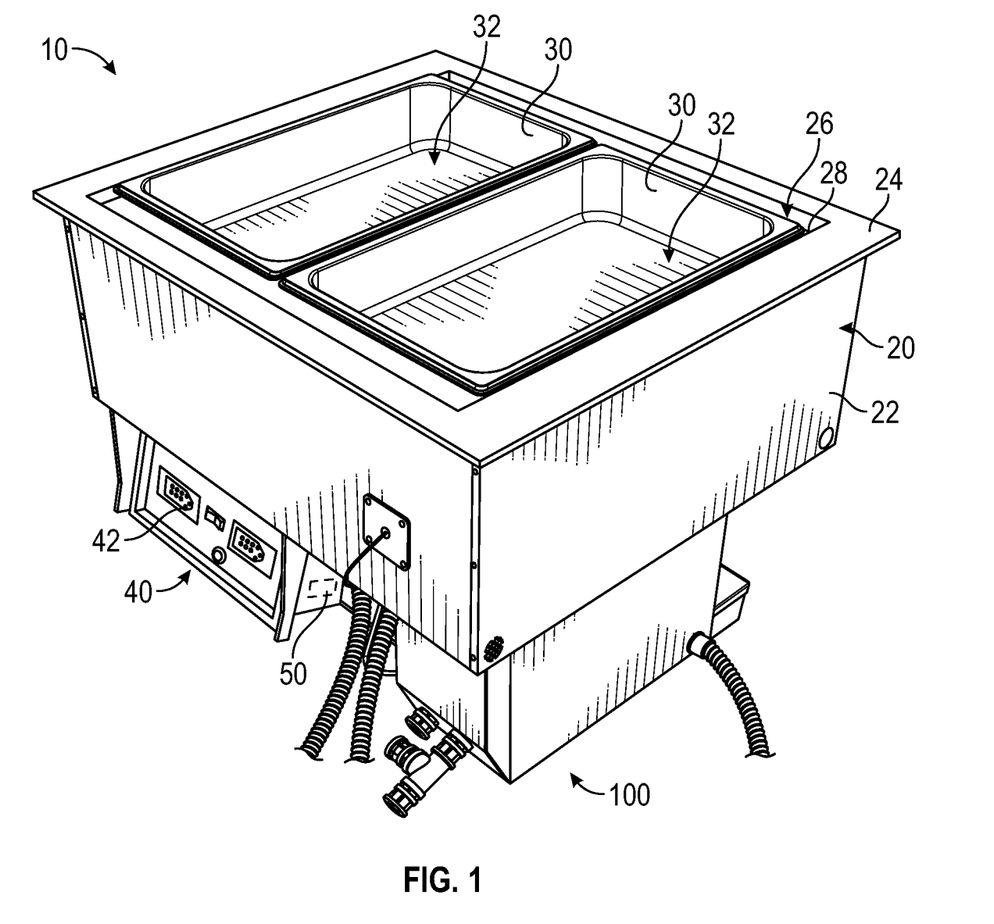
FIG. 1 is a perspective view of a temperature regulation unit, according to an exemplary embodiment.

According to the exemplary embodiment shown in FIGS. 1-5, a temperature regulation unit, shown as hot-cold well 10, includes a housing or enclosure, shown as base 20; a control unit, shown as control unit 40; and a temperature regulation system, shown as warming and cooling system 100. As shown in FIG. 1, the user interface 42, the controller 50, and the warming and cooling system 100 are at least partially disposed within and/or coupled to the base 20. According to an exemplary embodiment, the base 20 is made from a non-metallic material. As shown in FIG. 1, the base 20 has a plurality of sidewalls, shown as sidewalls 22, that define the outer shape of the base 20. According to the exemplary embodiment shown in FIG. 1, the base 20 is rectangular in shape. In other embodiments, the base 20 is otherwise shaped (e.g., square, circular, etc.). As shown in FIG. 1, the base 20 includes a surface, shown as top surface 24, that extends around the periphery of the sidewalls 22. The sidewalls 22 and the top surface 24 cooperatively define a cavity, shown as pan cavity 26, that selectively receives one or more pans (e.g., stainless steel food pans, etc.), shown as food pans 30, and houses the warming and cooling system 100. As shown in FIG. 1, the base 20 includes a protrusion, shown as ledge 28, that extends around the periphery of the sidewalls 22 and is at least partially recessed into the pan cavity 26. In other embodiments, the ledge 28 extends inward from the sidewall 22. The ledge 28 is positioned to provide a surface for the food pans 30 to rest on such that the food pans 30 are suspended within the pan cavity 26.

As shown in FIG. 1, the base 20 is configured to support two half-sized food pans 30. The base 20 may also support a single, full-sized food pan 30. In other embodiments, the base 20 is sized to receive three or more half-sized food pans 30 and/or two or more full-sized food pans 30. In some embodiments, a single, full-sized food pan 30 is replaceable with three on-third-sized food pans 30. As shown in FIG. 1, the food pans 30 define a cavity, shown as food cavity 32. The food cavities 32 of the food pans 30 may have various depths to accommodate (e.g., receive, hold, store, etc.) different types of food products. In some embodiments, the base 20 is adjustable such that food pans 30 having various depth food cavities 32 may be received by the base 20. By way of example, the food cavities 32 of the food pans 30 may facilitate a user (e.g., chef, cook, staff, owner, etc.) in separating or arranging various items (e.g., hot and cold items, solid and liquid items, align sandwiches or ice cream bars, etc.). For example, one food cavity 32 may receive a liquid-based food product (e.g., soup, etc.), and another food cavity 32 may receive a solid-based food product (e.g., sandwiches, pasta, etc.). As another example, one food cavity 32 may receive a first food product that is desirable when warm and another food cavity 32 may receive a second food product that is desirable when cold.

As shown in FIGS. 2-5, the warming and cooling system 100 includes an enclosure, shown as internal enclosure 110; a first thermal assembly, shown as cooling assembly 130; a second thermal assembly, shown as warming assembly 140; and one or more power devices, shown as inverters 150. In some embodiments, the warming and cooling system 100 additionally includes an air current device (e.g., a fan, a blower, etc.), shown as air current generator 160; a humidifier device, shown as humidifier 170; and/or one or more sensors, shown as sensors 180.

Figure 2:
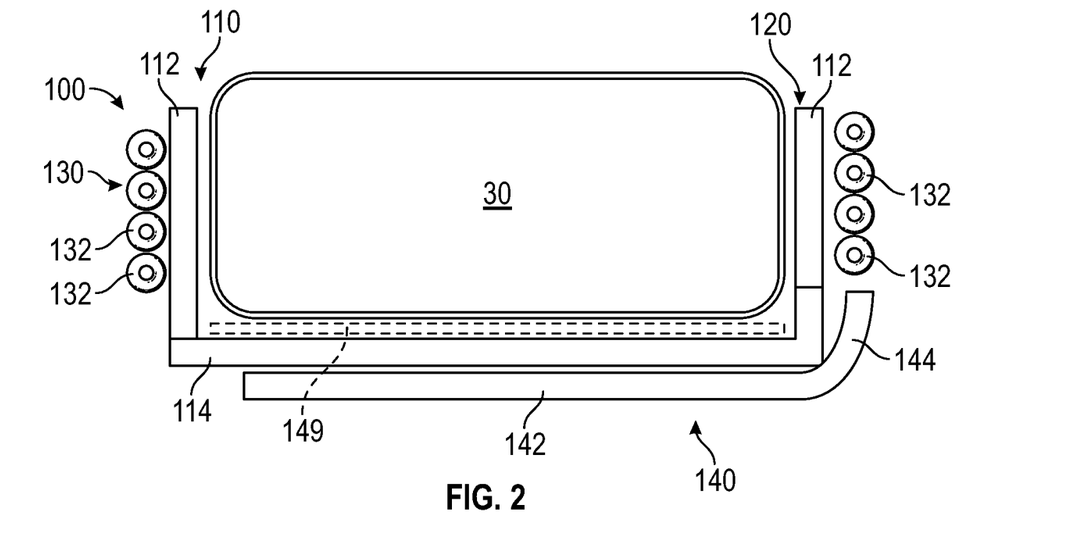
FIG. 2 is a cross-sectional view of a warming and cooling system of the temperature regulation unit of FIG. 1, according to an exemplary embodiment.
Figure 3:
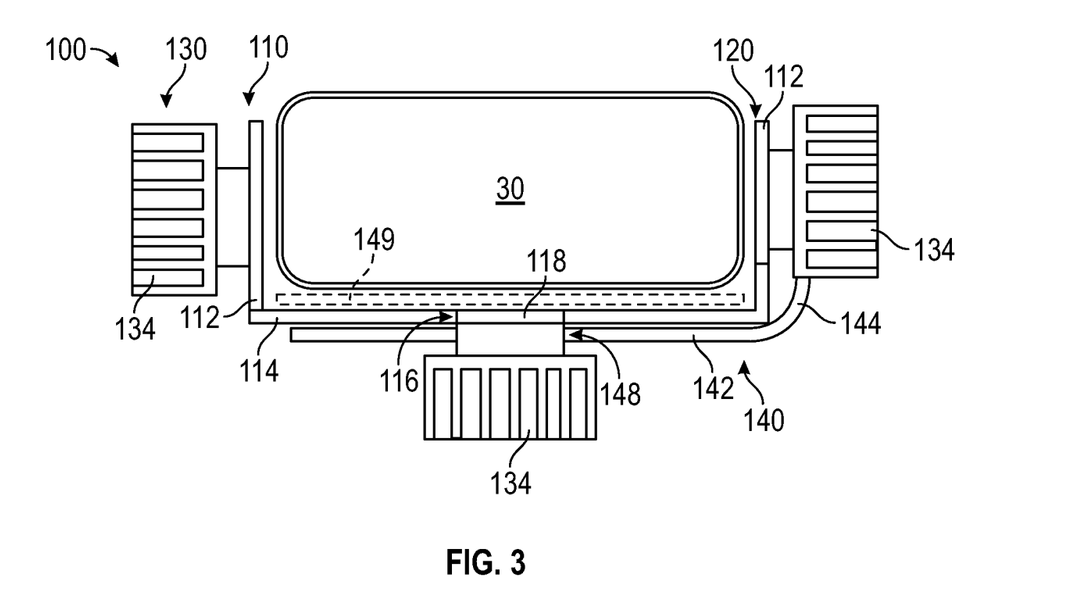
FIG. 3 is a cross-sectional view of a warming and cooling system of the temperature regulation unit of FIG. 1, according to another exemplary embodiment.
Figure 4:
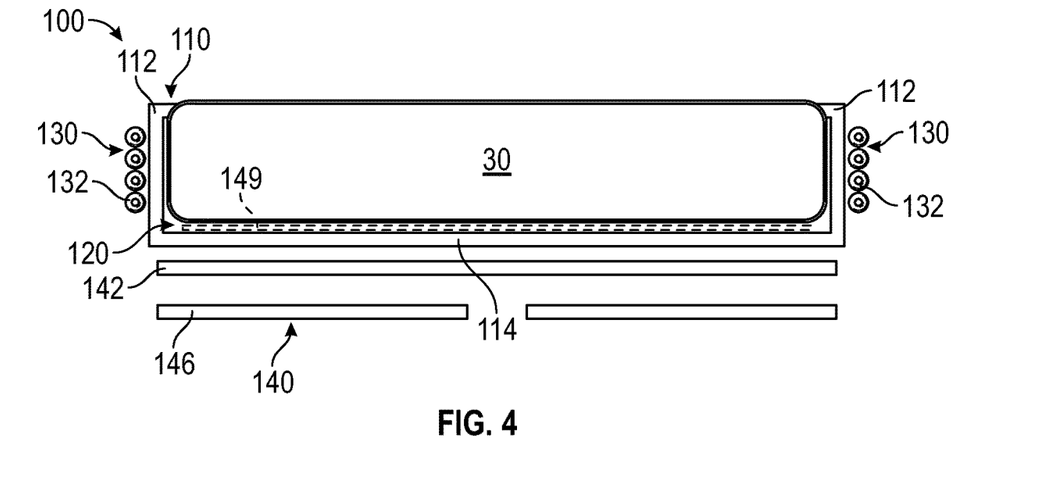
FIG. 4 is a cross-sectional view of a warming and cooling system of the temperature regulation unit of FIG. 1, according to still another exemplary embodiment.

As shown in FIGS. 2-4, the internal enclosure 110 includes a bottom surface, shown as a bottom wall 114, and a plurality of sidewalls, shown as internal sidewalls 112, that extend around the periphery of the bottom wall 114. As shown in FIGS. 2 and 3, the bottom wall 114 at least partially extends upward along the periphery thereof (e.g., forms at least a portion of the internal sidewalls 112, etc.). In other embodiments, the bottom wall 114 is flat. As shown in FIGS. 2-4, the internal sidewalls 112 and the bottom wall 114 cooperatively define an internal cavity, shown as temperature regulated cavity 120. The temperature regulated cavity 120 is configured to receive the food pans 30 when the food pans 30 are inserted within the pan cavity 26 of the base 20 such that the internal enclosure 110 surrounds at least a portion of the food pans 30. According to an exemplary embodiment, the internal sidewalls 112 are manufactured from a first material and the bottom wall 114 is manufactured from a different, second material. According to an exemplary embodiment, the internal sidewalls 112 are manufactured from a metal or a metal alloy, and the bottom wall 114 is manufactured from a plastic or a polymer material. In some embodiments, the internal sidewalls 112 and/or the bottom wall 114 are manufactured from another type of material (e.g., a ceramic material, etc.). In other embodiments, the internal sidewalls 112 and the bottom wall 114 are manufactured from the same material.

According to an exemplary embodiment, the warming and cooling system 100 is configured to facilitate heating and/or cooling the contents stored within the food cavities 32 of the food pans 30. In some embodiments, the warming and cooling system 100 is configured to facilitate differentially heating and/or cooling the food pans 30 received within the hot-cold well 10. By way of example, one food pan 30 may be heated to a first temperature (e.g., 90 degrees Fahrenheit, etc.) and a second food pan 30 may be heated to a second, different temperature (e.g., 120 degrees Fahrenheit, etc.). By way of another example, one food pan 30 may be cooled to a first temperature (e.g., 45 degrees Fahrenheit, etc.) and a second food pan 30 may be cooled to a second, different temperature (e.g., 30 degrees Fahrenheit, etc.). By way of yet another example, one food pan 30 may be heated to a first temperature (e.g., 90 degrees Fahrenheit, etc.) and a second food pan 30 may be cooled to a second, different temperature (e.g., 30 degrees Fahrenheit, etc.).

As shown in FIGS. 2 and 4, the cooling assembly 130 includes a plurality of cooling elements, shown as cooling coils 132, positioned along and around the periphery of the internal sidewalls 112 of the internal enclosure 110. The cooling coils 132 may thereby be positioned between the sidewalls 22 of the base 20 and the internal sidewalls 112 of the internal enclosure 110. In some embodiments, the cooling coils 132 are additionally or alternatively positioned along the bottom wall 114 of the internal enclosure 110. The cooling coils 132 may be manufactured from copper, aluminum, stainless steel, and/or still another material. In some embodiments, the cooling coils 132 may be positioned at varying heights along the internal sidewalls 112 to facilitate providing differing cooling effects with the cooling assembly 130.

According to an exemplary embodiment, the cooling coils 132 are used in a refrigeration cycle to facilitate performing a cooling operation on food products stored within one or more of the food pans 30. By way of example, the cooling coils 132 may receive a working fluid (e.g., a refrigerant such as R-134a, etc.) in the refrigeration cycle. The working fluid may flow through the cooling coils 132 and absorb thermal energy (e.g., evaporation, etc.) from a surrounding environment, the food products, the internal sidewalls 112, and/or the food pans 30, reducing the temperatures thereof (e.g., to maintain a target temperature or target temperature range of the food products, etc.). The absorbed thermal energy (e.g., heat, etc.) may be rejected into the surrounding environment (e.g., room, air, etc.) through the remaining steps in the refrigeration cycle (e.g., compression, condensation, expansion, etc.). The cooling assembly 130 of FIGS. 2 and 4 may thereby be configured as an evaporative cooling refrigeration system. In other embodiments, the cooling assembly 130 additionally or alternatively includes a different type of cooling element (e.g., a thermoelectric cooler, a Peltier device, a solid-state refrigeration system, etc.).

As shown in FIGS. 2 and 3, the warming assembly 140 includes a heating element (e.g., an induction coil, a work coil, etc.), shown as heating coil 142, positioned along the bottom wall 114 of the internal enclosure 110. As shown in FIGS. 2 and 3, the heating coil 142 includes a portion, shown as curved portion 144, that extends at least partially along the internal sidewalls 112. The heating coil 142 may thereby be configured as a three-dimensional heating coil that extends in three directions or planes (i.e., horizontally along the bottom wall 114 in width and length, and vertically along the internal sidewalls 112). In other embodiments, the heating coil 142 is configured as two-dimensional heating coil that extends in two directions or planes (i.e., horizontally along the bottom wall 114 in width and length). As shown in FIG. 4, the warming assembly 140 includes a second heating element, shown as second heating coil 146, positioned beneath the heating coil 142 such that the warming assembly 140 includes two layers of heating elements.

In one embodiment, the heating coil 142 and/or the second heating coil 146 are each a single, continuous coil. The single, continuous coil may be arranged in a zig-zag pattern, a square pattern, a circular pattern, a rectangular pattern, and/or still another pattern. In other embodiments, the heating coil 142 and/or the second heating coil 146 each includes a plurality of discrete heating coils or an array of heating coils (e.g., a plurality of spaced coils, etc.). Each of the heating coils within the array may be individually controlled to facilitate providing varying amounts of thermal energy across the hot-cold well 10 (e.g., facilitates providing zoned control where a first zone is heated at a first temperature, a second zone is heated at a second temperature, etc.). The heating coil 142 and/or the second heating coil 146 may have a flat cross-sectional profile, a circular cross-sectional profile, an ovular cross-sectional profile, a square cross-sectional profile, a rectangular cross-sectional profile, and/or still another cross-sectional profile.

According to an exemplary embodiment, the heating coil 142 and/or the second heating coil 146 are configured to facilitate performing a warming or heating operation on food products stored within one or more of the food pans 30. By way of example, the heating coil 142 and/or the second heating coil 146 may provide thermal energy (e.g., heat, etc.) to the food products positioned within the food pans 30 (e.g., to maintain a target temperature or target temperature range of the food products, etc.) through the bottom wall 114 and/or at least a portion of the internal sidewalls 112. According to an exemplary embodiment, the heating coil 142 and/or the second heating coil 146 are induction coils. The inverters 150 are configured to regulate the power provided to the heating coil 142 and/or the second heating coil 146 to control the amount of thermal energy provided to the food pans 30. In one embodiment, the inverter 150 is a single inverter device that powers both the heating coil 142 and the second heating coil 146. In another embodiment, the inverter 150 includes a first inverter device that powers the first heating coil 142 and a second inverter device that powers the second heating coil 146. In other embodiments, the warming assembly 140 additionally or alternatively includes a different type of heating element (e.g., a strip heater, a Peltier device, a resistive heating element, a radiant heating element, a tubular element or other heating conduit that receives a heated working fluid, a blanket heating element, etc.).

In some embodiments, as shown in FIGS. 2-4, the warming and cooling system 100 includes a metal plate (e.g., a stainless steel plate, an aluminum plate, an aluminum/stainless steel alloy plate, a Currie point alloy plate, etc.), shown as thermal distribution plate 149. The thermal distribution plate 149 may be positioned above the bottom wall 114 (e.g., such that the bottom wall 114 is positioned between the thermal distribution plate 149 and the heating coil 142, etc.) and/or below the bottom wall 114 (e.g., such that the thermal distribution plate 149 is positioned between the bottom wall 114 and the heating coil 142, etc.). According to an exemplary embodiment, the thermal distribution plate 149 is configured to spread the thermal energy (e.g., heat, etc.) provided by the warming assembly 140 (e.g., the heating coil 142, the second heating coil 146, etc.) more evenly across the bottom surface of the food pans 30 (e.g., eliminate hot spots, provide a consistent amount of thermal energy across the bottom of the food pans 30, etc.).

In some embodiments, the cooling coils 132, the heating coil 142, and/or the second heating coil 146 are embedded into a block (e.g., an aluminum block, etc.) that is shaped to correspond with the internal enclosure 110 and/or the food pans 30. In some embodiments, the block replaces the internal enclosure 110. The block may facilitate transferring thermal energy to or removing thermal energy from the food pans 30 directly between the block and the food pans 30.

As shown in FIG. 3, the warming and cooling system 100 does not include the cooling coils 132. Rather, the warming and cooling system 100 includes a plurality of dual-functioning thermal elements, shown as Peltier devices 134. According to an exemplary embodiment, the Peltier devices 134 have dual functionality such that they are capable of providing both a heating operation and a cooling operation (e.g., a solid state refrigeration system, etc.). The inverters 150 (e.g., a separate inverter, a second inverter, a third inverter, etc.) may be configured to regulate the power provided to the Peltier devices 134 (e.g., by a DC power supply, etc.) to control the amount of thermal energy provided to or removed from the food pans 30. The Peltier devices 134 may be capable of being powered individually such that zoned heating and/or cooling may be provided.

The Peltier devices 134 may be variously positioned about the internal enclosure 110 such that one or more Peltier devices 134 are positioned along and/or engage with one or more of the internal sidewalls 112 (e.g., between the sidewalls 22 of the base 20 and the internal sidewalls 112 of the internal enclosure 110, etc.) and one or more Peltier devices 134 are positioned along and/or engage with the bottom wall 114. As shown in FIG. 3, the heating coil 142 defines an aperture, shown as aperture 148, and the bottom wall 114 includes a portion, shown as portion 118, that is manufactured from a different material than the remainder of the bottom wall 114. By way of example, the portion 118 may be manufactured from the same or similar material as the internal sidewalls 112 (e.g., a metal, a metal alloy, etc.) or different than both the material of the internal sidewalls 112 and the bottom wall 114. As shown in FIG. 3, the aperture 148 is positioned to align with the portion 118 of the bottom wall 114 and receive at least a portion of a Peltier device 134 such that the Peltier device 134 extends through the aperture 148 and engages the portion 118 of the bottom wall 114. In some embodiments, the heating coil 142 defines a plurality of apertures 148 and the bottom wall 114 has a plurality of portions 118 spaced along the bottom wall 114 such that the warming and cooling system 100 may include a plurality of the Peltier devices 134 positioned along the bottom wall 114. The Peltier devices 134 may provide the cooling operation alone and provide the heating operation either alone or in combination with the heating coil 142 (and/or the second heating coil 146).

According to an exemplary embodiment, the air current generator 160 is positioned about the hot-cold well 10 and configured to facilitate providing an air current layer to the food pans 30 (e.g., within the temperature regulated cavity 120, etc.) and/or across the tops of the food pans 30. Providing the air current layer to the food pans 30 may facilitate providing convective heat transfer. Providing the air current layer across the tops of the food pans 30 may prevent contaminants from interacting with the food products within the food pans 30. According to an exemplary embodiment, the humidifier 170 is positioned about the hot-cold well 10 and configured to facilitate providing moisture (i.e., humidity) to the air current layer and/or within the temperature regulated cavity 120 to increase the thermal capacity (e.g., the cooling capacity of the cooling assembly 130, the cooling coils 132, the Peltier devices 134, etc.).

In some embodiments, the hot-cold well 10 includes a drain positioned within the internal enclosure 110 (e.g., within the bottom wall 114, etc.) to facilitate cleaning and draining the temperature regulated cavity 120 (e.g., draining water, cleaning solutions, food products, etc. from the temperature regulated cavity 120). In some embodiments, the bottom wall 114 is angled, sloped, or curved to improve the cleaning and draining of the temperature regulated cavity 120.

The sensors 180 may include one or more temperature sensors (e.g., a thermistor, etc.) positioned to facilitate monitoring the temperature of the cooling coils 132, the Peltier devices 134, the heating coils 142, the internal sidewalls 112, the bottom wall 114, the temperature regulated cavity 120, the food pans 30, and/or the food products within the food cavities 32 of the food pans 30. The sensors 180 may additionally or alternatively include one or more detection sensors positioned to detect the presence (or lack thereof) of a food pan 30 above a respective heating coil 142 or Peltier device 134 of the warming assembly 140 and/or proximate a respective cooling coil 132 or Peltier device 134 of the cooling assembly 130. The detection of a respective food pan 30 may facilitate activating the warming assembly 140 and/or the cooling assembly 130 only in areas or zones where a food pan 30 is positioned. The detection sensors may include current sensors, infrared sensors, weight sensors, a switch (e.g., that is engaged by a food pan 30 when set into the pan cavity 26, etc.), and/or still other detection sensors.

Figure 5:
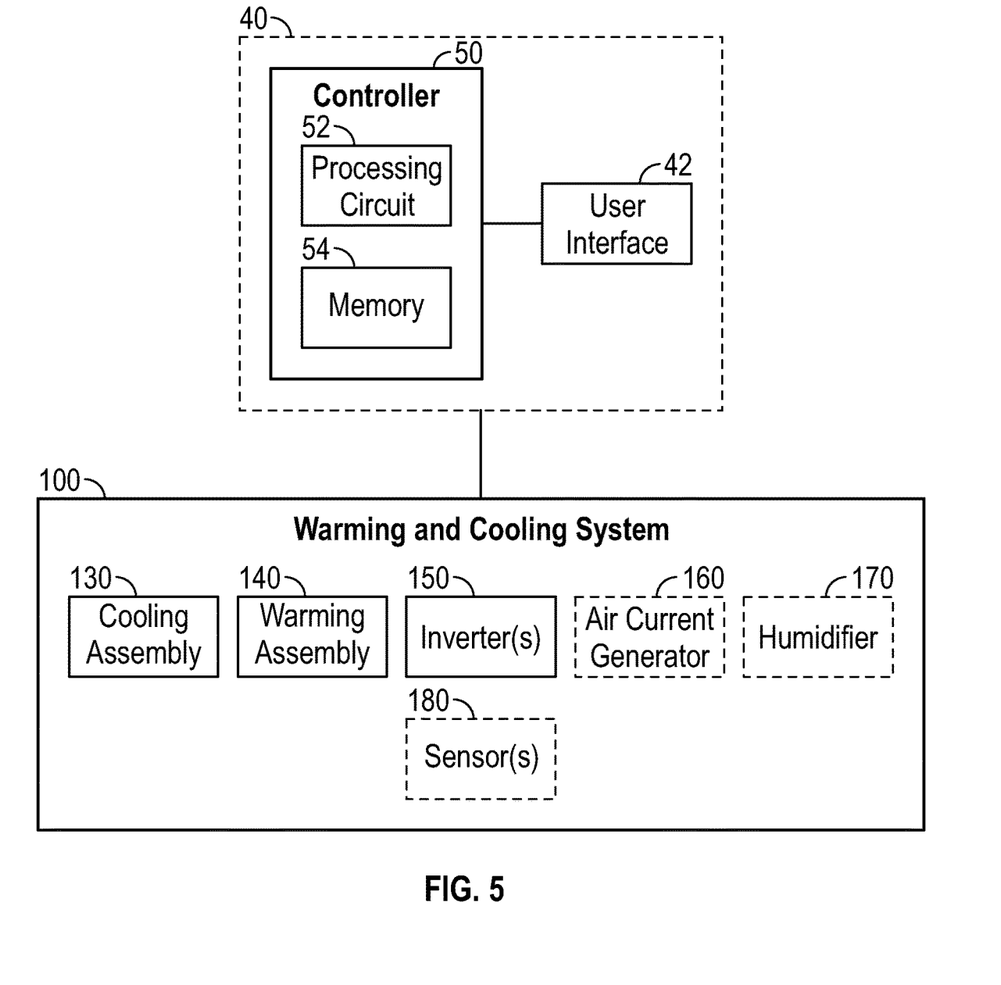
FIG. 5 is a schematic diagram of the temperature regulation unit of FIG. 1, according to an exemplary embodiment.

As shown in FIGS. 1 and 5, the control unit 40 includes an interface, shown as user interface 42, and a controller, shown as controller 50. In one embodiment, the controller 50 is configured to selectively engage, selectively disengage, control, and/or otherwise communicate with components of the hot-cold well 10. As shown in FIG. 5, the controller 50 is coupled to the user interface 42 and the warming and cooling system 100 (e.g., the cooling assembly 130, the warming assembly 140, the inverters 150, the air current generator 160, the humidifier 170, the sensors 180, etc.). In other embodiments, the controller 50 is coupled to more or fewer components. By way of example, the controller 50 may send and receive signals with the user interface 42, the cooling assembly 130, the warming assembly 140, the inverters 150, the air current generator 160, the humidifier 170, and/or the sensors 180.

The controller 50 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to the exemplary embodiment shown in FIG. 5, the controller 50 includes a processing circuit 52 and a memory 54. The processing circuit 52 may include an ASIC, one or more FPGAs, a DSP, circuits containing one or more processing components, circuitry for supporting a microprocessor, a group of processing components, or other suitable electronic processing components. In some embodiments, the processing circuit 52 is configured to execute computer code stored in the memory 54 to facilitate the activities described herein. The memory 54 may be any volatile or non-volatile computer-readable storage medium capable of storing data or computer code relating to the activities described herein. According to an exemplary embodiment, the memory 54 includes computer code modules (e.g., executable code, object code, source code, script code, machine code, etc.) configured for execution by the processing circuit 52.

According to an exemplary embodiment, the user interface 42 facilitates communication between an operator (e.g., cook, chef, staff member, etc.) of the hot-cold well 10 and one or more components (e.g., the cooling assembly 130, the warming assembly 140, the inverters 150, the air current generator 160, the humidifier 170, the sensors 180, etc.) of the warming and cooling system 100. By way of example, the user interface 42 may include at least one of an interactive display, a touchscreen device, one or more buttons (e.g., a stop button configured to turn the unit off, buttons allowing a user to set a target temperature, buttons to turn a lighting element on and off, etc.), and switches. In one embodiment, the user interface 42 includes a notification device (e.g., alarm, light, display, etc.) that notifies the operator when the hot-cold well 10 is on, off, in a standby mode, in a heating mode, and/or in a cooling mode. In some embodiments, a display of the user interface shows a current temperature of the cooling coils 132, the Peltier devices 134, the heating coils 142, the internal sidewalls 112, the bottom wall 114, the temperature regulated cavity 120, the food pans 30, and/or the food products within the food cavities 32 of the food pans 30.

According to an exemplary embodiment, the controller 50 is configured to receive temperature data from the sensors 180 regarding a temperature of the cooling coils 132, the Peltier devices 134, the heating coils 142, the internal sidewalls 112, the bottom wall 114, the temperature regulated cavity 120, the food pans 30, and/or the food products within the food cavities 32 of the food pans 30. The controller 50 may be configured to actively control the cooling assembly 130, the warming assembly 140, the inverters 150, the air current generator 160, and/or the humidifier 170 to regulate the temperature of the food products within the food pans 30 such that the temperature thereof is maintained at a current temperature or brought to a desired temperature.

According to an exemplary embodiment, the controller 50 is configured to receive detection data from the sensors 180 regarding the presence (or lack thereof) of one or more food pans 30 disposed within the pan cavity 26. By way of example, the controller 50 may be configured to selectively activate and deactivate portions of the cooling assembly 130 (e.g., individual Peltier devices 134, individual sections of the cooling coils 132, etc.) and/or the warming assembly 140 (e.g., individual Peltier devices 134, individual sections of the heating coils 142 and/or the second heating coils 146, etc.) such that only portions of the cooling assembly 130 and/or the warming assembly 140 proximate (e.g., below, adjacent, etc.) the food pans 30 are activated (e.g., to provide zoned control, etc.). The controller 50 may be configured to provide zoned temperature control based on a user input received with the user interface 42 such that a first food pan 30 is thermally regulated at a first temperature (e.g., 90 degrees, etc.) and a second food pan 30 is thermally regulated at a second temperature (e.g., 40 degrees, 100 degrees, etc.).

Figure 6:
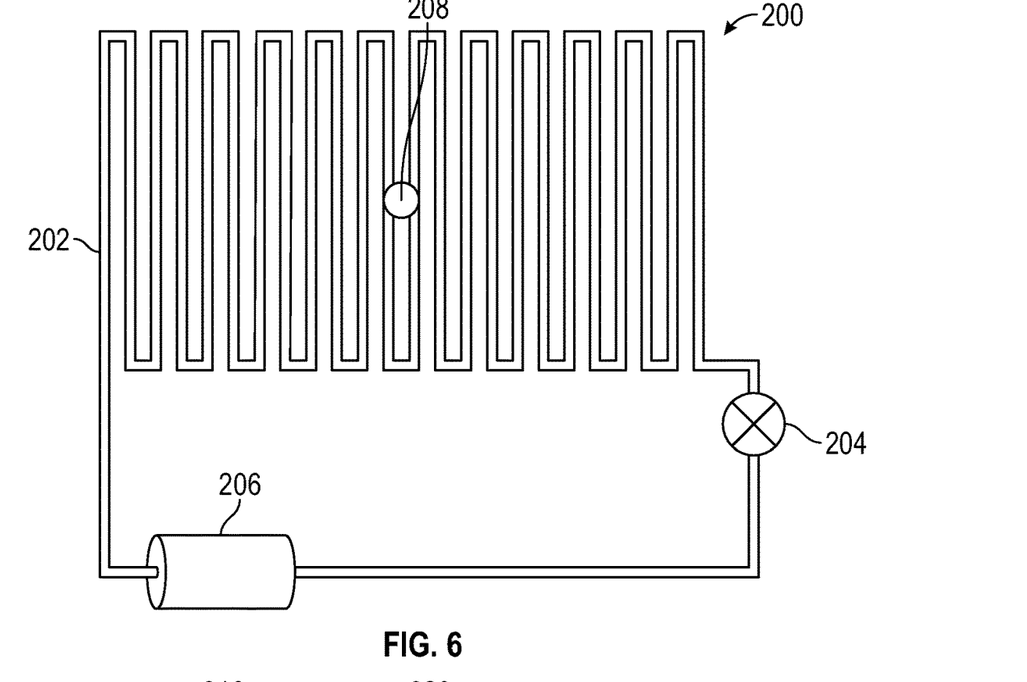
FIG. 6 is a schematic view of a single-zone warming or cooling system of the temperature regulation unit of FIG. 1, according to an exemplary embodiment.

According to the exemplary embodiment shown in FIG. 6, the hot-cold well 10 additionally or alternatively includes a second temperature regulation unit, shown as single-zone warming or cooling system 200. The single-zone warming or cooling system 200 may be used in combination with the warming and cooling system 100 or in place of the warming and cooling system 100. In some embodiments, the hot-cold well 10 includes a plurality of single-zone warming or cooling systems 200 (e.g., one for each full-sized food pan 30, one for each one-third-sized food pan 30, etc.).

As shown in FIG. 6, the single-zone warming or cooling system 200 includes a conduit, shown as coiled piping 202; a pump, shown as fluid pump 204, configured to pump a working fluid (e.g., water, a refrigerant, a water-glycol mixture, low viscosity oil, etc.) through the coiled piping 202; a thermal element, shown as thermal element 206, positioned along the coiled piping 202 and configured to thermally regulate the working fluid; and a sensor, shown as temperature sensor 208, positioned to facilitate monitoring the temperature of the working fluid, the coiled piping 202, the temperature regulated cavity 120, and/or associated food pan(s) 30. In one embodiment, the coiled piping 202 spans the entire temperature regulated cavity 120 (e.g., a single-pan cavity, a multi-pan cavity, etc.). In other embodiments, the coiled piping 202 spans only a portion of the temperature regulated cavity 120 such that the hot-cold well 10 may include a plurality of single-zone warming or cooling systems 200 (e.g., one associated with each full-sized food pan 30, etc.). The coiled piping 202 may be positioned on the bottom and/or sides of the temperature regulated cavity 120 or a zone of the temperature regulated cavity 120 associated therewith. The coiled piping 202 may be manufactured from copper, stainless steel, or still another thermally conductive material.

In one embodiment, the thermal element 206 is a cooling element. By way of example, the thermal element 206 may be or include a Peltier cooling element positioned within the coiled piping 202 (e.g., the working fluid flows over the thermal element 206, etc.). By way of another example, the thermal element 206 may be another type of cooling element (e.g., a thermoelectric cooler, a solid-state refrigeration system, a heat exchanger used as part of a refrigeration system, positioned around the coiled piping 202, etc.). According to an exemplary embodiment, the cooling element is configured to cool the working fluid to a desired temperature to thermally regulate the contents within associated food pans 30.

In another embodiment, the thermal element 206 is a heating element. By way of example, the thermal element 206 may be or include a tubular induction heating coil positioned around a portion of the coiled piping 202. By way of another example, the thermal element 206 may be another type of heating element (e.g., a heat exchanger used as part of a heating system, a boiler, a Peltier device, etc.). According to an exemplary embodiment, the heating element is configured to heat the working fluid to a desired temperature to thermally regulate the contents within associated food pans 30. In some embodiments, the thermal element 206 is a dual-functioning thermal element (e.g., capable of providing both a heating operation and the cooling operation, a Peltier heating and cooling device, etc.). In some embodiments, the hot-cold well 10 includes at least one single-zone warming or cooling system 200 having a cooling element and at least one single-zone warming or cooling system 200 having a heating element to facilitate providing cooling to one zone and heating to another zone of the temperature regulated cavity 120.

Figure 7:
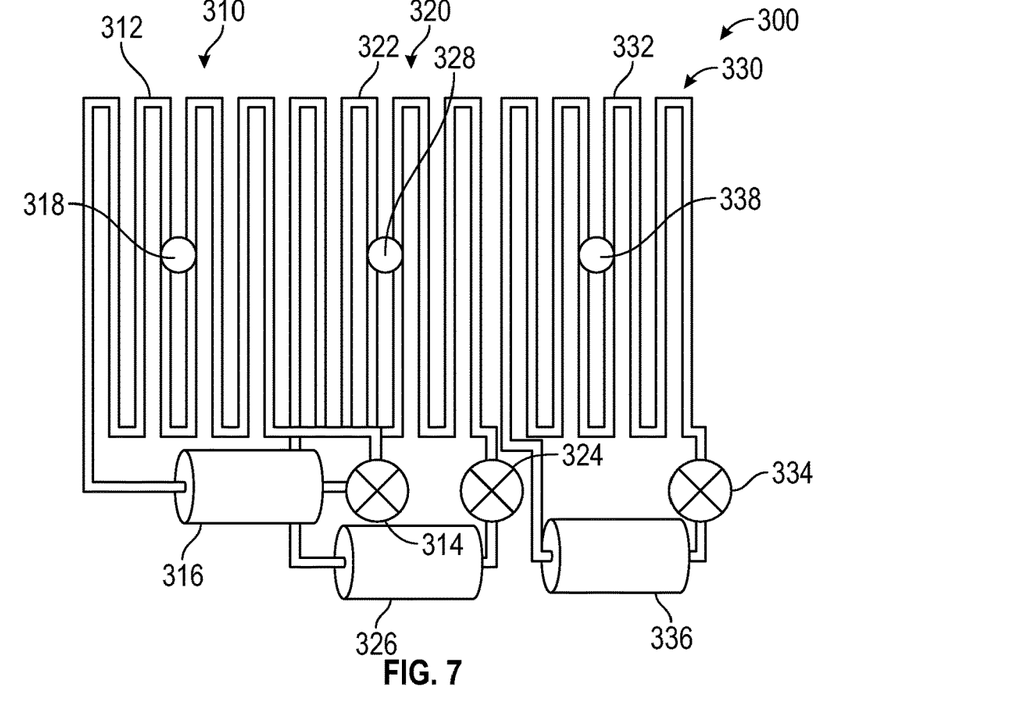
FIG. 7 is a schematic view of a multi-zone warming or cooling system of the temperature regulation unit of FIG. 1, according to an exemplary embodiment.

According to the exemplary embodiment shown in FIG. 7, the hot-cold well 10 additionally or alternatively includes a third temperature regulation unit, shown as multi-zone warming or cooling system 300. The multi-zone warming or cooling system 300 may be used in combination with the warming and cooling system 100 or in place of the warming and cooling system 100. In some embodiments, the hot-cold well 10 includes a plurality of multi-zone warming or cooling systems 300 (e.g., one for each full-sized food pan 30, etc.).

As shown in FIG. 7, the multi-zone warming or cooling system 300 includes a plurality of warming or cooling assemblies, shown as first warming or cooling assembly 310, second warming or cooling assembly 320, and third warming or cooling assembly 330. In one embodiment, each of the first warming or cooling assembly 310, the second warming or cooling assembly 320, and the third warming or cooling assembly 330 is associated with a single, full-sized food pan 30. In another embodiment, the first warming or cooling assembly 310, the second warming or cooling assembly 320, and the third warming or cooling assembly 330 are cooperatively associated with a single, full-sized food pan 30 such that each of the first warming or cooling assembly 310, the second warming or cooling assembly 320, and the third warming or cooling assembly 330 is associated with a single, one-third-sized food pan 30. In such an embodiment, the multi-zone warming or cooling system 300 may be configured to provide variable heating and/or cooling to subzones within a respective zone associated with each of the first warming or cooling assembly 310, the second warming or cooling assembly 320, and the third warming or cooling assembly 330, respectively (e.g., a zone defined by a single, full-sized food pan 30 is divided into three subzones, each associated with a single, one-third-sized food pan 30, etc.). In other embodiments, the multi-zone warming or cooling system 300 includes fewer or greater than three warming and cooling assemblies (e.g., two, four, five, etc.). In some embodiments, the hot-cold well includes a plurality of multi-zone warming or cooling system 300 (e.g., one for each full-sized food pan 30, etc.).

As shown in FIG. 7, the first warming or cooling assembly 310 includes a first conduit, shown as first coiled piping 312; a first pump, shown as first fluid pump 314, configured to pump a first working fluid (e.g., water, a refrigerant, a water-glycol mixture, low viscosity oil, etc.) through the first coiled piping 312; a first thermal element, shown as first thermal element 316, positioned along the first coiled piping 312 and configured to thermally regulate the first working fluid; and a first sensor, shown as first temperature sensor 318, positioned to facilitate monitoring the temperature of the first working fluid, the first coiled piping 312, the temperature regulated cavity 120, and/or associated food pan(s) 30.

As shown in FIG. 7, the second warming or cooling assembly 320 includes a second conduit, shown as second coiled piping 322; a second pump, shown as second fluid pump 324, configured to pump a second working fluid (e.g., water, a refrigerant, a water-glycol mixture, low viscosity oil, etc.) through the second coiled piping 322; a second thermal element, shown as second thermal element 326, positioned along the second coiled piping 322 and configured to thermally regulate the second working fluid; and a second sensor, shown as second temperature sensor 328, positioned to facilitate monitoring the temperature of the second working fluid, the second coiled piping 322, the temperature regulated cavity 120, and/or associated food pan(s) 30.

As shown in FIG. 7, the third warming or cooling assembly 330 includes a third conduit, shown as third coiled piping 332; a third pump, shown as third fluid pump 334, configured to pump a third working fluid (e.g., water, a refrigerant, a water-glycol mixture, low viscosity oil, etc.) through the third coiled piping 332; a third thermal element, shown as third thermal element 336, positioned along the third coiled piping 332 and configured to thermally regulate the third working fluid; and a third sensor, shown as third temperature sensor 338, positioned to facilitate monitoring the temperature of the third working fluid, the third coiled piping 332, the temperature regulated cavity 120, and/or associated food pan(s) 30.

The first coiled piping 312, the second coiled piping 322, and/or the third coiled piping 332 may be positioned on the bottom and/or sides of the temperature regulated cavity 120 or a zone of the temperature regulated cavity 120 associated therewith. The first coiled piping 312, the second coiled piping 322, and/or the third coiled piping 332 may be manufactured from copper, stainless steel, or still another thermally conductive material. In one embodiment, the multi-zone warming or cooling system 300 includes a single inverter 150 that drives each of the first thermal element 316, the second thermal element 326, and the third thermal element 336. In another embodiment, the multi-zone warming or cooling system 300 includes a plurality of inverters 150, one for each of the first thermal element 316, the second thermal element 326, and the third thermal element 336.

In one embodiment, the first thermal element 316, the second thermal element 326, and/or the third thermal element 336 are heating elements. By way of example, the first thermal element 316, the second thermal element 326, and/or the third thermal element 336 may be or include a tubular induction heating coil positioned around a portion of the first coiled piping 312, the second coiled piping 322, and/or the third coiled piping 332, respectively. By way of another example, the first thermal element 316, the second thermal element 326, and/or the third thermal element 336 may be another type of heating element (e.g., a heat exchanger used as part of a heating system, a boiler, a Peltier device, etc.). According to an exemplary embodiment, the heating elements are configured to heat the first working fluid, the second working fluid, and/or the third working fluid, respectively, to a desired temperature to thermally regulate the contents within associated food pans 30.

In another embodiment, the first thermal element 316, the second thermal element 326, and/or the third thermal element 336 are cooling elements. By way of example, the first thermal element 316, the second thermal element 326, and/or the third thermal element 336 may be or include a Peltier cooling element positioned within the first coiled piping 312, the second coiled piping 322, and/or the third coiled piping 332, respectively. By way of another example, the first thermal element 316, the second thermal element 326, and/or the third thermal element 336 may be another type of cooling element (e.g., a thermoelectric cooler, a solid-state refrigeration system, a heat exchanger used as part of a refrigeration system, positioned around the respective coiled piping, etc.). According to an exemplary embodiment, the cooling elements are configured to cool the first working fluid, the second working fluid, and/or the third working fluid, respectively, to a desired temperature to thermally regulate the contents within associated food pans 30. In some embodiments, the first thermal element 316, the second thermal element 326, and/or the third thermal element 336 are dual-functioning thermal elements (e.g., capable of providing both a heating operation and the cooling operation, a Peltier heating and cooling device, etc.). In some embodiments, the hot-cold well 10 includes at least one multi-zone warming or cooling system 300 having heating elements and at least one multi-zone warming or cooling system 300 having cooling elements to facilitate providing heating to one zone and cooling to another zone of the temperature regulated cavity 120.

Figure 8:
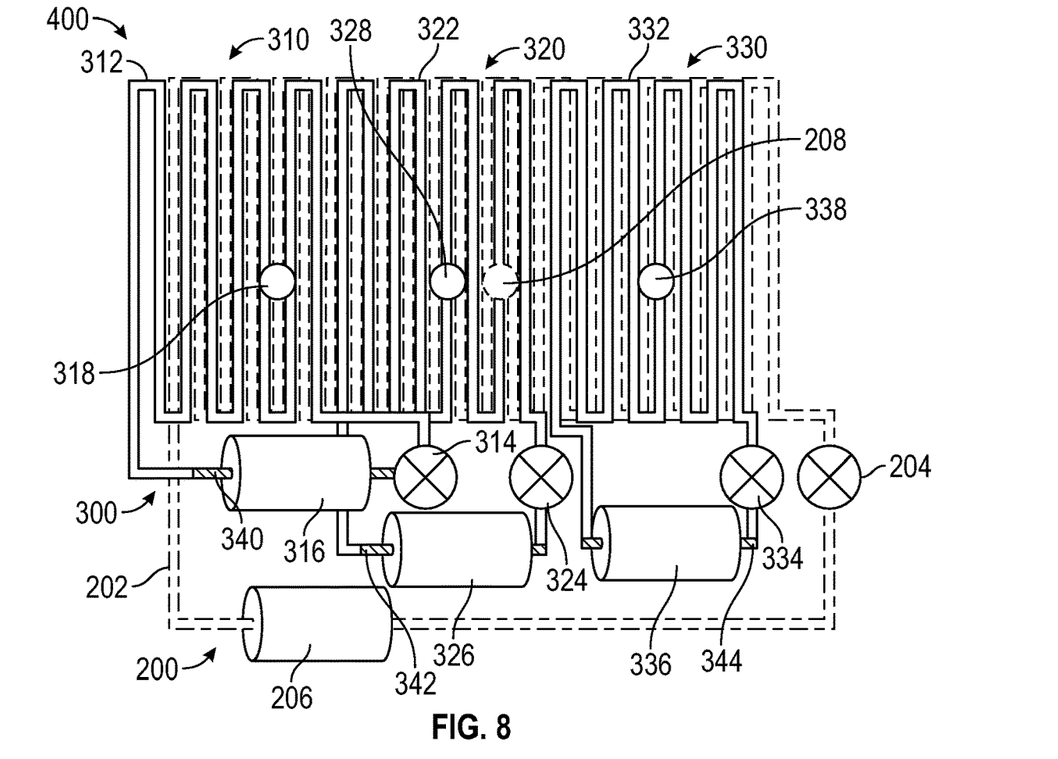
FIG. 8 is a schematic view of a combined, multi-zone warming and cooling system of the temperature regulation unit of FIG. 1, according to an exemplary embodiment.

According to the exemplary embodiment shown in FIG. 8, the hot-cold well 10 additionally or alternatively includes a fourth temperature regulation unit, shown as multi-zone warming and cooling system 400. The multi-zone warming and cooling system 400 may be used in combination with the warming and cooling system 100 or in place of the warming and cooling system 100. In some embodiments, the hot-cold well 10 includes a plurality of multi-zone warming and cooling systems 400 (e.g., one for each full-sized food pan 30, etc.).

As shown in FIG. 8, the multi-zone warming and cooling system 400 includes a combination of the single-zone warming or cooling system 200 and the multi-zone warming or cooling system 300. In one embodiment, (i) the thermal element 206 of the single-zone warming or cooling system 200 is a cooling element and (ii) each of the first thermal element 316, the second thermal element 326, and the third thermal element 336 of the multi-zone warming or cooling system 300 is a heating element. In such an embodiment, the single-zone warming or cooling system 200 is configured to provide cooling to a respective zone of the hot-cold well 10, while the multi-zone warming or cooling system 300 is configured to provide variable heating to subzones of the respective zone of the hot-cold well 10. In another embodiment, (i) the thermal element 206 of the single-zone warming or cooling system 200 is a heating element and (ii) each of the first thermal element 316, the second thermal element 326, and the third thermal element 336 of the multi-zone warming or cooling system 300 is a cooling element. In such an embodiment, the single-zone warming or cooling system 200 is configured to provide heating to a respective zone of the hot-cold well 10, while the multi-zone warming or cooling system 300 is configured to provide variable cooling to subzones of the respective zone of the hot-cold well 10.

As shown in FIG. 8, the first coiled piping 312, the second coiled piping 322, and the third coiled piping 332 include a first portion, shown as first section 340, a second portion, shown as second section 342, and a third portion, shown as third section 344, respectively, that the first thermal element 316, the second thermal element 326, and the third thermal element 336 are coupled to. In some embodiments, the first section 340 of the first coiled piping 312, the second section 342 of the second coiled piping 322, and/or the third section 344 of the third coiled piping 332 are manufactured from a different material that the remainder of the first coiled piping 312, the second coiled piping 322, and/or the third coiled piping 332, respectively (e.g., when the remainder of the first coiled piping 312, the second coiled piping 322, and/or the third coiled piping 332 is manufactured from copper, etc.). By way of example, the first section 340, the second section 342, and/or the third section 344 may be manufactured from stainless steel.

Figure 9:
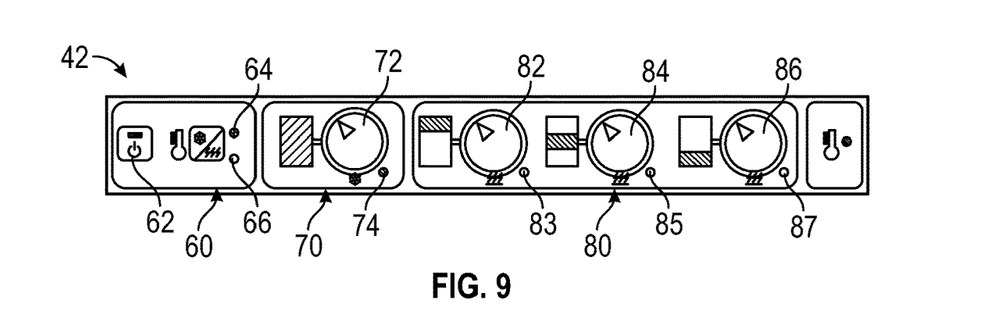
FIGS. 9 and 10 are various views of user interfaces of the combined, multi-zone warming and cooling system of FIG. 8, according to various exemplary embodiments.
Figure 10:
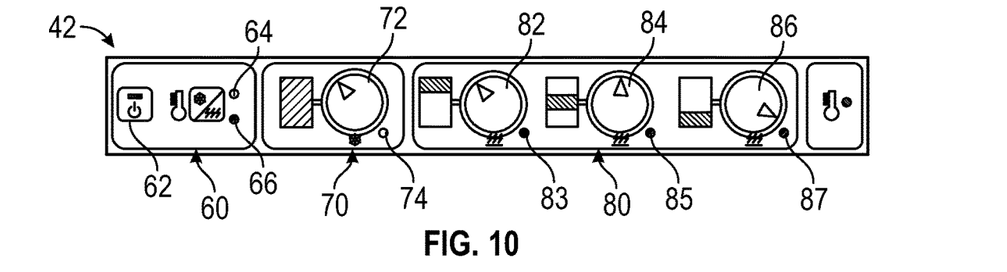

Referring to FIGS. 9 and 10, the user interface 42 of the hot-cold well 10 having the multi-zone warming and cooling system 400 is shown, according to an exemplary embodiment. The user interface 42 of the multi-zone warming and cooling system 400 includes a first portion, shown as power interface 60, a second portion, shown as cooling interface 70, and a third portion, shown as warming interface 80. As shown in FIGS. 9 and 10, the power interface 60 includes a button, shown as power button 62, and a pair of indicators, shown as cooling indicator 64 and warming indicator 66. The power button 62 may facilitate turning the hot-cold well 10 on and off. The cooling indicator 64 may illuminate to indicate that the hot-cold well 10 is in a cooling mode. The warming indicator 66 may illuminate to indicate that the hot-cold well 10 is in a warming mode. As shown in FIGS. 9 and 10, the cooling interface 70 includes an adjuster, shown as cooling dial 72 and an indicator, shown as cooling activation indicator 74. The cooling dial 72 may facilitate adjusting a cooling temperature of the hot-cold well 10 (e.g., of the single-zone warming or cooling system 200, etc.). The cooling activation indicator 74 may illuminate to indicate a cooling system of the hot-cold well 10 is active.

As shown in FIGS. 9 and 10, the warming interface 80 includes a first adjuster, shown as first warming dial 82, a first indicator, shown as first warming activation indicator 83, a second adjuster, shown as second warming dial 84, a second indicator, shown as second warming activation indicator 85, a third adjuster, shown as third warming dial 86, and a third indicator, shown as third warming activation indicator 87. The first warming dial 82 may facilitate adjusting a warming temperature of a first zone of the hot-cold well 10 (e.g., the first warming or cooling assembly 310, etc.), the second warming dial 84 may facilitate adjusting a warming temperature of a second zone of the hot-cold well 10 (e.g., the second warming or cooling assembly 320, etc.), and the third warming dial 86 may facilitate adjusting a warming temperature of a third zone of the hot-cold well 10 (e.g., the third warming or cooling assembly 330, etc.). The first warming activation indicator 83, the second warming activation indicator 85, and the third warming activation indicator 87 may illuminate to indicate a respective zone of a warming system of the hot-cold well 10 is active. In other embodiments, the cooling interface 70 facilitates independently controlling a plurality of cooling zones and/or the warming interface 80 facilitates controlling a single warming zone.

Figure 11:
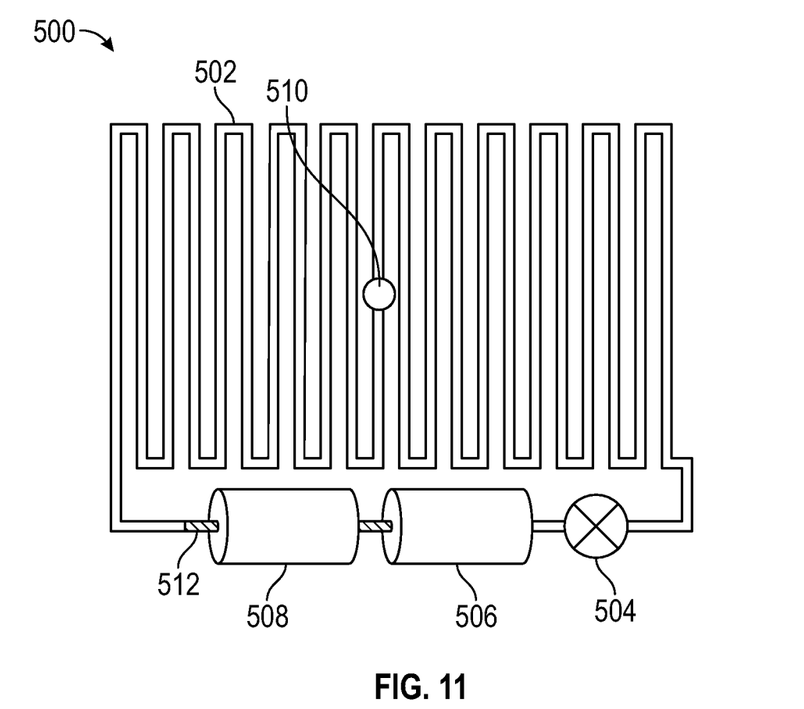
FIG. 11 is a schematic view of a combined, single-zone, inline warming and cooling system of the temperature regulation unit of FIG. 1, according to an exemplary embodiment.

According to the exemplary embodiment shown in FIG. 11, the hot-cold well 10 additionally or alternatively includes a fifth temperature regulation unit, shown as single-zone, inline warming and cooling system 500. The single-zone, inline warming and cooling system 500 may be used in combination with the warming and cooling system 100 or in place of the warming and cooling system 100. In some embodiments, the hot-cold well 10 includes a plurality of single-zone, inline warming and cooling systems 500 (e.g., one for each full-sized food pan 30, one for each one-third-sized food pan 30, etc.). In some embodiments, the hot-cold well 10 includes any combination of the warming and cooling system 100, the single-zone warming or cooling systems 200, the multi-zone warming or cooling systems 300, the multi-zone warming and cooling systems 400, and the single-zone, inline warming and cooling systems 500 (e.g., different warming and/or cooling systems positioned to thermally regulate different zones of the temperature regulated cavity 120, etc.).

As shown in FIG. 11, the single-zone, inline warming and cooling system 500 includes a conduit, shown as coiled piping 502; a pump, shown as fluid pump 504, configured to pump a working fluid (e.g., water, a refrigerant, a water-glycol mixture, low viscosity oil, etc.) through the coiled piping 502; a first thermal element, shown as cooling element 506, positioned along the coiled piping 502 and configured to cool the working fluid; a second thermal element, shown as heating element 508, positioned along the coiled piping 502, in line with the cooling element 506, and configured to heat the working fluid; and a sensor, shown as temperature sensor 510, positioned to facilitate monitoring the temperature of the working fluid, the coiled piping 502, the temperature regulated cavity 120, and/or associated food pan(s) 30.

In one embodiment, the coiled piping 502 spans the entire temperature regulated cavity 120 (e.g., a single-pan cavity, a multi-pan cavity, etc.). In other embodiments, the coiled piping 502 spans only a portion of the temperature regulated cavity 120 such that the hot-cold well 10 may include a plurality of single-zone, inline warming and cooling systems 500 (e.g., one associated with each full-sized food pan 30, etc.). The coiled piping 502 may be positioned on the bottom and/or sides of the temperature regulated cavity 120 or a zone of the temperature regulated cavity 120 associated therewith. The coiled piping 502 may be manufactured from copper, stainless steel, or still another thermally conductive material. As shown in FIG. 11, the coiled piping 502 includes a portion, shown as section 512, that the cooling element 506 and/or the heating element 508 are coupled to. In some embodiments, the section 512 of the coiled piping 502 is manufactured from a different material than the remainder of the coiled piping 502 (e.g., when the remainder of the coiled piping 502 is manufactured from copper, etc.). By way of example, the section 512 may be manufactured from stainless steel.

By way of example, the cooling element 506 may be or include a Peltier cooling element positioned within the coiled piping 502 (e.g., the working fluid flows over the cooling element 506, etc.). By way of another example, the cooling element 506 may be another type of cooling element (e.g., a thermoelectric cooler, a solid-state refrigeration system, a heat exchanger used as part of a refrigeration system, positioned around the coiled piping 502, etc.). According to an exemplary embodiment, the cooling element 506 is configured to cool the working fluid to a desired temperature to thermally regulate the contents within associated food pans 30.

By way of example, the heating element 508 may be or include a tubular induction heating coil positioned around the section 512 of the coiled piping 502. By way of another example, the heating element 508 may be another type of heating element (e.g., a heat exchanger used as part of a heating system, a boiler, a Peltier device, etc.). According to an exemplary embodiment, the heating element 508 is configured to heat the working fluid to a desired temperature to thermally regulate the contents within associated food pans 30.

Figure 12:
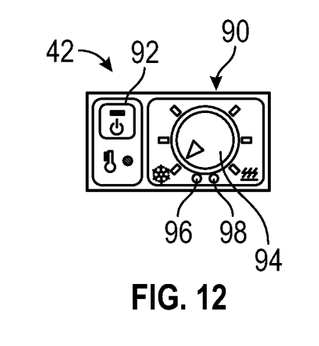
FIGS. 12-14 are various views of user interfaces of the combined, single-zone, inline warming and cooling system of FIG. 11, according to various exemplary embodiments.
Figure 13:
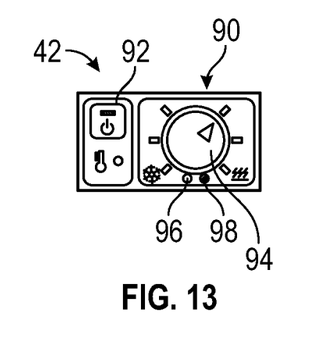
Figure 14:
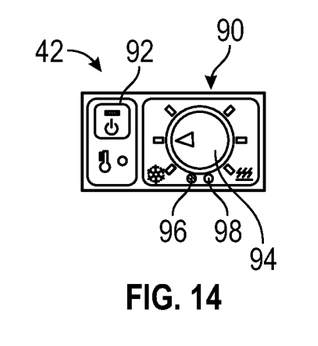

Referring to FIGS. 12-14, the user interface 42 of the hot-cold well 10 having the single-zone, inline warming and cooling system 500 is shown, according to an exemplary embodiment. As shown in FIGS. 12-14, the user interface 42 has a control interface 90 including a button, shown as power button 92, an adjuster, shown as temperature dial 94, and a pair of indicators, shown as cooling indicator 96 and warming indicator 98. The power button 92 may facilitate turning the hot-cold well 10 on and off. The temperature dial 94 may facilitate adjusting a cooling temperature or a warming temperature of the hot-cold well 10 (e.g., of the cooling element 506, of the heating element 508, etc.). The cooling indicator 96 may illuminate to indicate that the hot-cold well 10 is in a cooling mode (e.g., the cooling element 506 is active, etc.). The warming indicator 98 may illuminate to indicate that the hot-cold well 10 is in a warming mode (e.g., the heating element 508 is active, etc.).

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

The invention claimed is:

1. A food pan well comprising:
a base defining an internal cavity; and
a temperature regulating system disposed within the internal cavity, the temperature regulating system including:
an internal enclosure positioned within the internal cavity, the internal enclosure including a bottom wall and a sidewall that extends around a periphery of the bottom wall, the bottom wall and the sidewall cooperatively defining a temperature regulated cavity, wherein the base is configured to support one or more food pans such that the one or more food pans are selectively suspendable within the temperature regulated cavity; and
an inline warming and cooling system comprising:
a conduit that carries a thermally regulated working fluid;
a pump positioned to pump the thermally regulated working fluid through the conduit;
a cooling element positioned along the conduit and configured to cool the thermally regulated working fluid; and
a heating element positioned along the conduit in line with the cooling element and configured to heat the thermally regulated working fluid.

2. The food pan well of claim 1, wherein the bottom wall is manufactured from a first material and the sidewall is manufactured from a second material, the first material being different than the second material.

3. The food pan well of claim 1, wherein the inline warming and cooling system is a first inline warming and cooling system, further comprising a second inline warming and cooling system, and wherein (i) the first inline warming and cooling system and (ii) the second inline warming and cooling system facilitate providing zoned cooling and zoned heating within the temperature regulated cavity.

4. The food pan well of claim 1, wherein the cooling element is disposed within the conduit and the heating element is positioned around a portion of the conduit.

5. The food pan well of claim 4, wherein the portion of the conduit is manufactured from a material that is different than a remainder of the conduit.

6. The food pan well of claim 1, further comprising a thermal distribution plate positioned within the temperature regulated cavity, the thermal distribution plate configured to spread thermal energy provided by the inline warming and cooling system evenly across the one or more food pans.

7. The food pan well of claim 1, further comprising at least one of:
   an air current generator positioned to at least one of (i) provide an air current within the temperature regulated cavity to the one or more food pans and (ii) provide an air current layer across a top of the one or more food pans; and
   a humidifier positioned to provide moisture at least one of (i) to the air current and (ii) within the temperature regulated cavity to increase a thermal capacity of the temperature regulating system.

8. The food pan well of claim 1, further comprising a sensor detection system positioned to identify if a food pan is suspended within the temperature regulated cavity, the sensor detection system including at least one of a current sensor, an infrared sensor, a weight sensor, and a switch.

9. The food pan well of claim 1, wherein the base is adjustable to facilitate using food pans of different depths.

10. A temperature regulating system for a hot-cold well, the temperature regulating system including:
   an enclosure including a bottom wall and a sidewall that extends around a periphery of the bottom wall, the bottom wall and the sidewall cooperatively defining a temperature regulated cavity, wherein one or more food pans are selectively suspendable within the temperature regulated cavity;
   a cooling assembly configured to facilitate cooling at least one of the one or more food pans; and
   a warming assembly configured to facilitate warming at least one of the one or more food pans;
   wherein the cooling assembly and the warming assembly form an inline warming and cooling system, the inline warming and cooling system including:
      a conduit that carries a thermally regulated working fluid;
      a pump positioned to pump the thermally regulated working fluid through the conduit;
      a cooling element positioned along the conduit and configured to cool the thermally regulated working fluid; and
      a heating element positioned along the conduit in line with the cooling element and configured to heat the thermally regulated working fluid.

11. The temperature regulating system of claim 10, wherein the inline warming and cooling system includes a plurality of inline warming and cooling systems positioned to facilitate providing variable zoned cooling and variable zoned heating within the temperature regulated cavity such that a first pan suspended within the temperature regulated cavity can be regulated to a different temperature than a second pan suspended within the temperature regulated cavity.

* * * * *